United States Patent Office.

WELLS H. WHITE, OF TROY, OHIO.

Letters Patent No. 74,963, dated February 25, 1868.

IMPROVED CONCRETE PAVEMENT.

*The Schedule referred to in these Letters Patent and making part of the same.*

TO ALL WHOM IT MAY CONCERN:

Be it known that I, WELLS H. WHITE, of Troy, in the county of Miami, and State of Ohio, have invented a new and useful Improvement in Concrete Pavements; and I do hereby declare that the following is a full, clear, and exact description of the same.

The composition is made as follows: Take of hard or distilled tar, five parts, of common coal-tar, one part, put them together in a boiler and boil them for several hours. Then take of good sand or fine gravel, three parts, and of stone-coal ashes, from one to two parts, according to the degree of hardness it is intended to give the composition when first laid down, and mix them thoroughly together, and put them into a flat-bottomed heater made of heavy sheet iron, and heat the whole mass to a high temperature, stirring them while heating. Then pour into the mixture several bucketfuls of saturated solution of salt, according to the quanity of gravel and ashes. Then pour into the foregoing mixture the boiling composition of hard and soft tar, and mix thoroughly. Then take out in suitable vessels, and pour the mixture over the ground to be paved, duly prepared to receive it, and spread it evenly, and, while yet hot, roll it with a heavy hot iron roller until the composition is perfectly packed and smooth, using marble-dust as a parting-sand, until the pavement is finished as desired. In about ten hours it will be hardened into a firm, smooth pavement.

What I claim as my invention, and desire to secure by Letters Patent, is—

Concrete pavements, composed of the materials, and laid hot, and then rolled with a hot roller, substantially as set forth.

In testimony whereof, I have signed my name to this specification in the presence of two subscribing witnesses.

WELLS H. WHITE.

Witnesses:
 C. H. CULBUTSON,
 O. H. BINKLEY.